Figure 4:
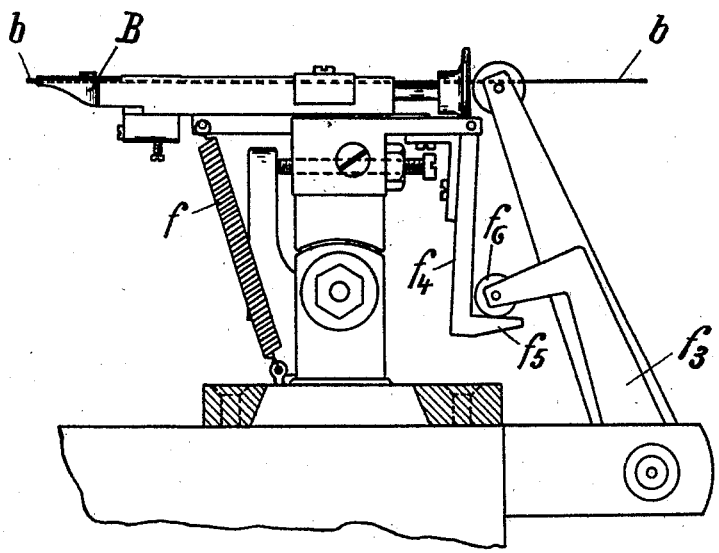

Dec. 25, 1923. 1,478,813
E. BECKER
AUXILIARY DEVICE FOR INSERTING LEAVES OF SOLDER INTO THE JOINTS
OF THE LINKS OF WIRE CHAINS
Filed Sept. 11, 1922 3 Sheets-Sheet 1
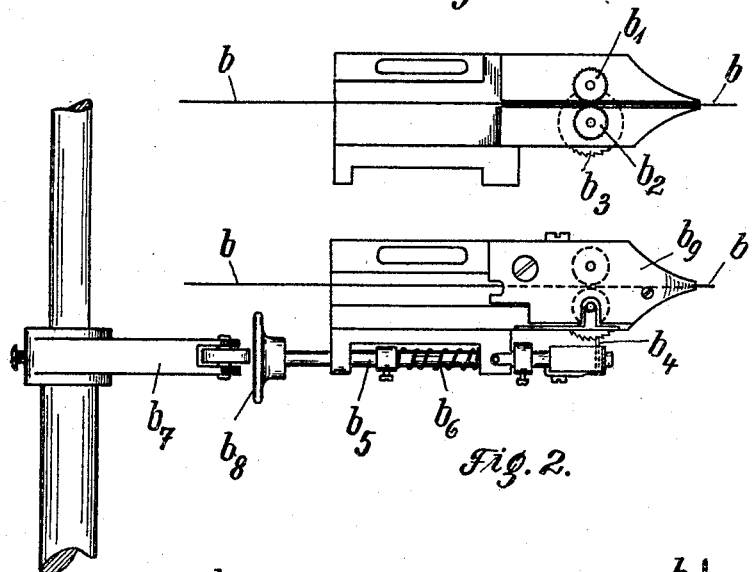
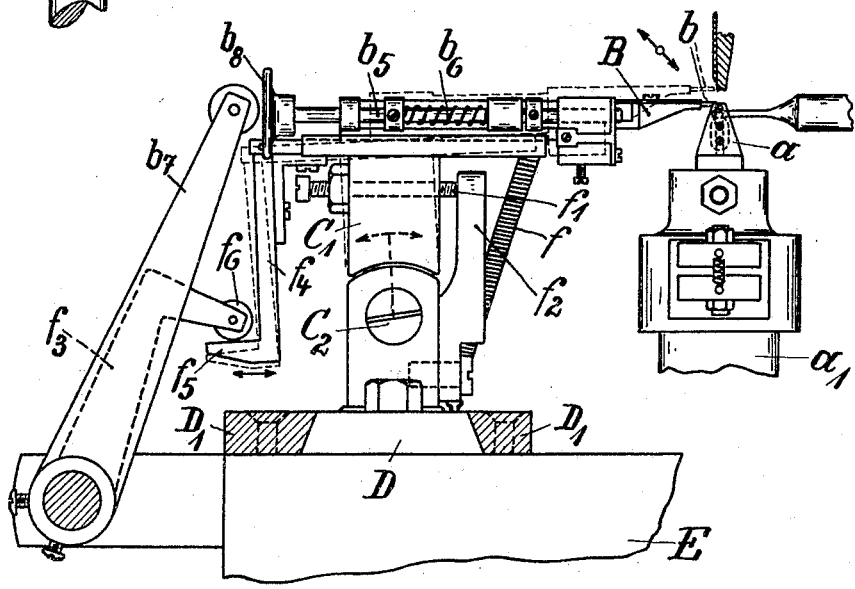

Dec. 25, 1923.                                           1,478,813
                        E. BECKER
AUXILIARY DEVICE FOR INSERTING LEAVES OF SOLDER INTO THE JOINTS
                 OF THE LINKS OF WIRE CHAINS
                 Filed Sept. 11, 1922      3 Sheets-Sheet 3

Patented Dec. 25, 1923.

1,478,813

UNITED STATES PATENT OFFICE.

EMIL BECKER, OF PFORZHEIM, GERMANY, ASSIGNOR TO ERNST GIDEON BEK, OF PFORZHEIM, GERMANY.

AUXILIARY DEVICE FOR INSERTING LEAVES OF SOLDER INTO THE JOINTS OF THE LINKS OF WIRE CHAINS.

Application filed September 11, 1922. Serial No. 587,605.

*To all whom it may concern:*

Be it known that I, EMIL BECKER, a citizen of the German Republic, and resident at Pforzheim, Germany, have invented certain new and useful Improvements in Auxiliary Devices for Inserting Leaves of Solder into the Joints of the Links of Wire Chains; and I do hereby declare the following to be a full, clear, and exact description of the invention, such as will enable others skilled in the art to which it appertains to make and use the same.

The device according to this invention is principally designed to be mounted on chain making machines for the manufacture of unsoldered chains for the purpose of enabling such machines to be used without alterations for making soldered chains. The device may, however, also be mounted on new machines.

The invention relates particularly to chain machines of the well known type, in which pincers, rotatable around a vertical axis, are used which execute, each time after completion of a chain ring, a rotation of 90°, whereupon they move upward for a certain distance to bring the finished ring into such position that a fresh piece of wire can be inserted.

The invention consists in a device to be mounted in front of the pincers and having a horizontal feeding channel for the solder to be inserted into the joint. In this device the soldering material in the shape of a thread is advanced with the aid of known means at each formation of a chain link a distance equal to the diameter of the chain wire.

The guide is arranged so that its front point from which the end of the solder wire projects executes an up and down movement. This serves for two purposes. The upward movement of the solder guide permits the rotating of the pincers and the upward movement of the same, the solder-guide itself being at rest at that time. At the downward movement of the solder-guide the projecting end of the solder-thread is inserted with its lower edge into the joint of the chain link which is still not yet closed, so that the joint closes upon this end of the solder thread. The insertion of the solder thread with the lower edge presents the advantage over the insertion in longitudinal direction, that it is more secure as the insertion of the lower edge of the solder thread into the joint in vertical direction is certainly more secure than the insertion of the front edge in longitudinal direction.

Figure 5:
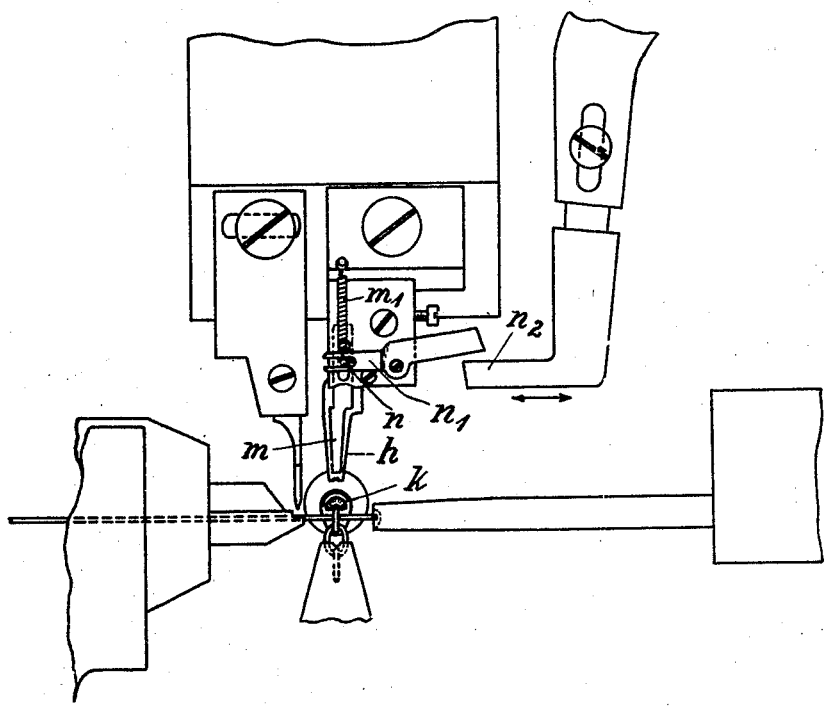

Reference is to be had to the accompanying drawing illustrating an embodiment of my invention. Fig. 1 is an elevation of the machine, with parts in section; Fig. 2 is a plan view of the member which guides the thread of solder, together with the parts associated with said guide; Fig. 3 is a plan view showing the guide plate alone, with the cover plate removed; Fig. 4 is an elevation of certain parts, looking in the direction opposite to Fig. 1; and Fig. 5 is an elevation of certain parts, looking from the left-hand side of Fig. 1.

In Fig. 1, $a$ are the jaws of the pincers which are opened and closed in the well known manner, the rotation and the up and down movement of these pincers being also effected in the well known manner by the rotation and raising and lowering of the shaft $a^1$ which supports the driving gear.

The solder thread $b$ is guided in the normally horizontal guide plate B, the support $C^1$ of which is mounted pivotally at $C^2$ on the carriage D sliding between guides $D^1$, upon the base plate E, this entire auxiliary device being thus adapted to be removed by the lateral withdrawal of the carriage. The guide spring $f$, the adjusting screw $f^1$ being in contact with the abutment $f^2$. The up and down movement of the plate B is controlled by a cam disk, not shown, which rocks the arm $f^3$ so that the roller $f^6$ of this arm strikes upon the projection $f^5$ of hook $f^4$ which hangs down from the rear part of the guide plate B.

The feeding of the solder thread $b$ in its guide is effected by two auxiliary disks $b^1$, $b^2$ the latter disk having a feed wheel $b^3$. The feeding tooth $b^4$ of the feeding rod $b^5$ engages with the feed wheel $b^3$, said rod $b^5$ being advanced against the pressure of spring $b^6$ through the intermediary of lever $b^7$ and contact disk $b^8$.

The movement of the joint forming tool and the cutting off of the point of the solder thread are shown in Fig. 5. $h$ is the joint forming tool which is operated in the well known manner in order to close the joint securely by one or more pressures exerted upon the ends of the wire and in order to bend the wire to ring-shape upon the mandrel $k$. The knife $m$ is arranged at the front side of the joint forming tool in a special guide and pulled up by the action of a spring $m^1$. The lever $n'$ pivotably connected with a stud $n$ which projects from the knife through a slit of the guide, is operated by the finger $n^2$ of a cam disk. The joint forming tool acts upon the ring at least twice but the knife is operated only at the second action of the joint forming tool. From this arrangement results the advantage that the end is cut off only if the solder thread has already been securely inserted in the joint so that it can be cut off more securely than would be the case otherwise. While I have illustrated an arrangement in which the up and down movement of the guide plate B is a rocking movement (about the horizontal axis $C^2$), I do not wish to restrict myself to this particular construction, and evidently a rectilinear movement toward and from the jaws $a$ would accomplish the same result.

Now what I claim and desire to secure by Letters Patent is the following:

1. In a wire chain making machine, a solder feeding device adapted for use in connection with link forming mechanism, comprising a guide for a solder thread adapted to hold a tip of the solder thread beyond its foremost end and direct it into the path through which said link forming mechanism moves a link blank and to retain said tip in said path during the closure of the link ends and a support for said guide, means to rock the support and guide alternately toward and from the link forming mechanism and a severing mechanism for severing the tip of the solder from the solder strip.

2. In a wire chain making machine, a solder feeding device adapted for use in connection with link forming mechanism, comprising a movable support, a solder thread guide carried by said support and normally adapted to direct the tip of the solder thread to the point at which the link blanks are successfully closed by said link forming mechanism and to retain said tip at such point during the closure of the link blank thereon, the said support being adapted to move the guide and the solder strip carried thereby alternately toward and from the point of closure of the link blanks and a severing mechanism for severing the tip of the solder from the solder strip.

3. In a wire chain making machine, a solder feeding device adapted for use in connection with link forming mechanism, comprising a movable support, a solder thread guide carried by said support and normally adapted to direct the tip of the solder thread to the point at which the link blanks are successfully closed by said link forming mechanism and to retain said tip at such point during the closure of the link blank thereon, the said support being adapted to move the guide and the solder strip carried thereby alternately toward and from the point of closure of the link blanks, and solder feed mechanism adapted to project the solder thread a predetermined distance beyond the extreme end of the guide after each successive link is formed and a severing mechanism for severing the tip of the solder from the solder strip while said tip is held by a link.

4. In a wire chain making machine, a solder feeding device adapted for use in connection with link forming mechanism, comprising a movable support and solder thread guide carried by said support and normally adapted to direct the tip of the solder thread to the point at which the link blanks are successfully closed by said link forming mechanism and to retain said tip at such point during the closure of the link blank thereon, the said support being adapted to move the guide and the solder strip carried thereby alternately toward and from the point of closure of the link blanks after each successive link is formed and a severing mechanism for severing the tip of the solder from the solder strip while said tip is held by a link, means to actuate said solder feed mechanism, means to move said support both the said means being actuated from a common source of power and a severing mechanism for severing the tip of the solder from the solder strip.

5. In a wire chain making machine, a solder feeding device adapted for use in connection with link forming mechanism, comprising a pivoted support arranged substantially parallel to the link forming mechanism, a solder thread guide and solder feed mechanism carried on said support, said solder feed mechanism comprising a rod, a tooth on said rod, a ratchet adapted to cause the solder carried by said solder guide to be fed along the guide, the tooth being adapted to engage with said ratchet, a spring normally retracting said rod, independent means to actuate said solder feed mechanism and to rock said support on said pivot and a severing mechanism for severing the tip of the solder from the solder strip.

6. In a wire chain making machine, a solder feeding device adapted for use in connection with movable link forming mechanism, comprising a pivoted support, a solder thread guide carried by said support and being arranged normally at right angles to the point at which the link forming mechanism are positioned, a solder thread carried by said guide, the tip of the solder thread projecting beyond the extreme end of the guide and normally positioned at the point where the link forming mechanism closed the link blank, the said support being pivoted, means to rock the support toward and from the link forming mechanism and a severing mechanism for severing the tip of the solder from the solder strip.

In testimony whereof I affix my signature.

EMIL BECKER.

Witnesses:
F. H. ANDERSON,
G. FLESCH.